(12) United States Patent
Braun et al.

(10) Patent No.: US 6,244,599 B1
(45) Date of Patent: *Jun. 12, 2001

(54) FLOATING BRUSH SEAL

(75) Inventors: Minel J. Braun, Akron; Fred K. Choy, Copley, both of OH (US)

(73) Assignee: Flowserve Management Company, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/301,398

(22) Filed: Apr. 28, 1999

(51) Int. Cl.⁷ .................................................. F16J 15/34
(52) U.S. Cl. .................... 277/352; 277/355; 277/362; 277/400
(58) Field of Search ................................ 277/352, 355, 277/362, 390, 400

(56) References Cited

U.S. PATENT DOCUMENTS

| | | |
|---|---|---|
| 2,365,046 | 12/1944 | Bottomley . |
| 2,498,739 | 2/1950 | Magnesen . |
| 2,871,041 | 1/1959 | Anderton . |
| 3,529,839 | 9/1970 | Greiner et al. . |
| 3,655,206 | 4/1972 | Adams . |
| 4,265,455 | 5/1981 | Lundgren . |
| 4,403,779 | 9/1983 | Wilkinson . |
| 4,486,026 | 12/1984 | Furumura et al. . |
| 4,696,480 | 9/1987 | Jornhagen . |
| 4,756,536 | * 7/1988 | Belcher . |
| 5,026,252 | 6/1991 | Hoffelner . |
| 5,106,104 | 4/1992 | Atkinson et al. . |
| 5,135,237 | 8/1992 | Flower . |
| 5,143,384 | 9/1992 | Lipschitz . |
| 5,318,309 | 6/1994 | Tseng et al. . |
| 5,335,920 | * 8/1994 | Tseng et al. . |
| 5,474,305 | 12/1995 | Flower . |
| 5,496,045 | 3/1996 | Millener et al. . |
| 5,568,931 | * 10/1996 | Tseng et al. . |
| 5,997,004 | * 12/1999 | Braun et al. .......................... 277/352 |
| 6,010,132 | * 1/2000 | Bagepalli et al. . |

FOREIGN PATENT DOCUMENTS

| 651 161 | 5/1979 | (SU) . |
|---|---|---|
| WO 86/05252 | 9/1986 | (WO) . |

* cited by examiner

*Primary Examiner*—Terry Lee Melius
*Assistant Examiner*—James M Hewitt
(74) *Attorney, Agent, or Firm*—Flynn, Thiel, Boutell & Tanis, P.C.

(57) ABSTRACT

A seal assembly which cooperates between relatively rotatable members for creating a sealing relationship between areas of high and low pressures. The assembly includes a face seal arrangement nonrotatably associated with one of the relatively rotatable members, which face seal arrangement defines thereon a pair of annular sealing faces, and an annular brush having a plurality of bristles disposed in an annular array. The brush bristles are mounted on the holder such that free ends thereof are in sealing contact with the other member to form a first seal between the areas of high and low pressures, whereby the brush is rotatable along with the other member to minimize wear thereto. The brush defines thereon a pair of annular sealing faces which are disposed in axially adjacent and opposed face-to-face relation with the respective sealing faces of the face seal arrangement to form a second seal between the areas of high and low pressures.

30 Claims, 8 Drawing Sheets

FLOATING BRUSH SEAL

CROSS-REFERENCE TO RELATED PATENT APPLICATIONS

This application is related to application Ser. No. 08/735 328, filed on Oct. 22, 1996, entitled "HYBRID FLOATING BRUSH SEAL", now U.S. Pat. No. 5,997,004. The disclosure of this U.S. Pat. No. 5,997,004 is, in its entirety, incorporated herein by reference. Further, this application is a continuation-in-part of our application Ser. No. 09/228 897, filed Jan. 11, 1999, entitled "HYBRID FLOATING BRUSH SEAL", now abandoned.

FIELD OF THE INVENTION

The present invention generally relates to a fluid seal for rotating members. More particularly, the present invention relates to a floating brush seal for use between a rotating member such as a shaft and a nonrotating member such as a housing, and also between two relatively rotating members, such as inner and outer shaft members, which seal includes the combination of a brush seal with a face seal arrangement to produce a low-friction seal for separating and sealing an area of high pressure from an area of low pressure.

BACKGROUND OF THE INVENTION

Apparatus such as aircraft engines, turbines, and pumps typically include at least one shaft that normally rotates at a relatively high speed. An apparatus such as an aircraft jet engine may include multiple shafts that normally operate at high speeds while passing through several zones of varying pressures. A jet engine creates thrust by compressing atmospheric air, mixing fuel with the compressed air and igniting it, and passing the ignited and expanded air/fuel mixture through a turbine. Zones having various pressures exist throughout the length of the engine. These zones must typically be sealed from one another in order to allow the engine to operate, and in particular to increase the efficiency of the aircraft engine. In addition to the high rotational speeds of an aircraft engine shaft, axial and radial shaft movement increases the difficulties associated with maintaining effective seals throughout the lifetime of the engine. An effective seal must be able to continuously accommodate both axial and radial shaft movement while maintaining the seal. When rigid seals are installed, shaft movement can create excessive wear leading to an ineffective seal.

One type of seal that has been increasingly used in recent years in order to accommodate the shaft movement mentioned above is a brush seal. Numerous configurations of brush seals for use with shafts are known in the art. Brush seals typically include a ring-shaped body member or holder having bristles extending therefrom. The bristles may extend radially inwardly or radially outwardly from the holder. In a typical configuration, the bristles contact the rotating member while the holder is fixed to a stationary support member. The bristles are flexible enough to allow the shaft to rotate against it, and to move both axially and radially, while effectively maintaining a seal. The bristles may be constructed from a variety of materials. One common construction is the use of metal or ceramic bristles that are held by the holder at one end and are free and in contact with the moving shaft at the other end. Another construction includes a series of interlocking fingers.

In the past, brush seals have been used unsuccessfully in apparatus such as aircraft engines, turbines, and pumps because of the high shaft speeds required by these devices. The high shaft speeds often cause the bristle portion contacting the shaft to rapidly deteriorate due to shaft eccentricity and the amount of heat that is quickly generated at the shaft/brush interface. When the bristle portions are constructed from a stronger material (e.g. ceramics), the section of the shaft contacting the bristle portion undesirably wears causing the entire shaft to require replacement or rehabilitation. The frictional engagement of the brush with the rotating member also creates the undesirable generation of heat.

Accordingly, it is an object of the invention to provide an improved seal for use between relatively rotatable members which overcomes the disadvantages discussed above. Specifically, the improved seal assembly according to the invention cooperates between a pair of relatively rotatable members for creating a sealing relationship between areas of high and low pressures. The seal assembly includes a face seal structure nonrotatably associated with one of the members and defining thereon an annular sealing face, and an annular brush which includes a plurality of bristles having free ends in sealing contact with the other member to form a first seal between the areas of high and low pressures and to cause rotation of the brush along with the other member. Further, the brush includes thereon an annular sealing face disposed and axially adjacent and opposed face-to-face relationship with the annular sealing face of the face seal structure to form a non-contacting second seal between the areas of high and low pressures.

Another aspect of the invention resides in a seal assembly cooperating between relatively rotatable inner and outer members for sealing between areas of high and low pressures, the seal assembly including a face seal structure nonrotatably associated with one of the inner and outer members and defining thereon first and second annular sealing faces. The assembly further includes an annular brush disposed between the inner and outer members which includes an annular array of bristles having free ends in sealing contact with the other member to form a first seal between the areas of high and low pressures and to cause rotation of the brush along with the other member. The brush includes thereon third and fourth annular sealing faces disposed in axially adjacent and opposed face-to-face relation with the respective first and second annular sealing faces of the face seal structure to form a noncontacting second seal between the areas of high and low pressures.

Yet another aspect of the invention resides in a seal assembly cooperating between a housing member and a shaft rotatable relative thereto for creating a sealing relationship between areas of high and low pressures. The seal assembly includes a face seal structure nonrotatably associated with the housing and defining thereon an annular sealing face, and an annular brush surrounding the shaft for rotation therewith and having a plurality of bristles disposed in an annular array about the shaft. The brush includes an annular holder with bristles mounted thereon such that free ends thereof are in sealing contact with the shaft to form a first seal between the areas of high and low pressures. The holder defines thereon an annular sealing face disposed in axially adjacent and opposed face-to-face relation with the annular sealing face of the face seal structure. In addition, the face seal structure includes a passage therein in communication with a gas source for directing a flow of gas between the opposed sealing faces to form a noncontacting second seal between the areas of high and low pressures.

The advantageous arrangement of the present invention, and the objects and purposes thereof, will be apparent to

Figure 1:
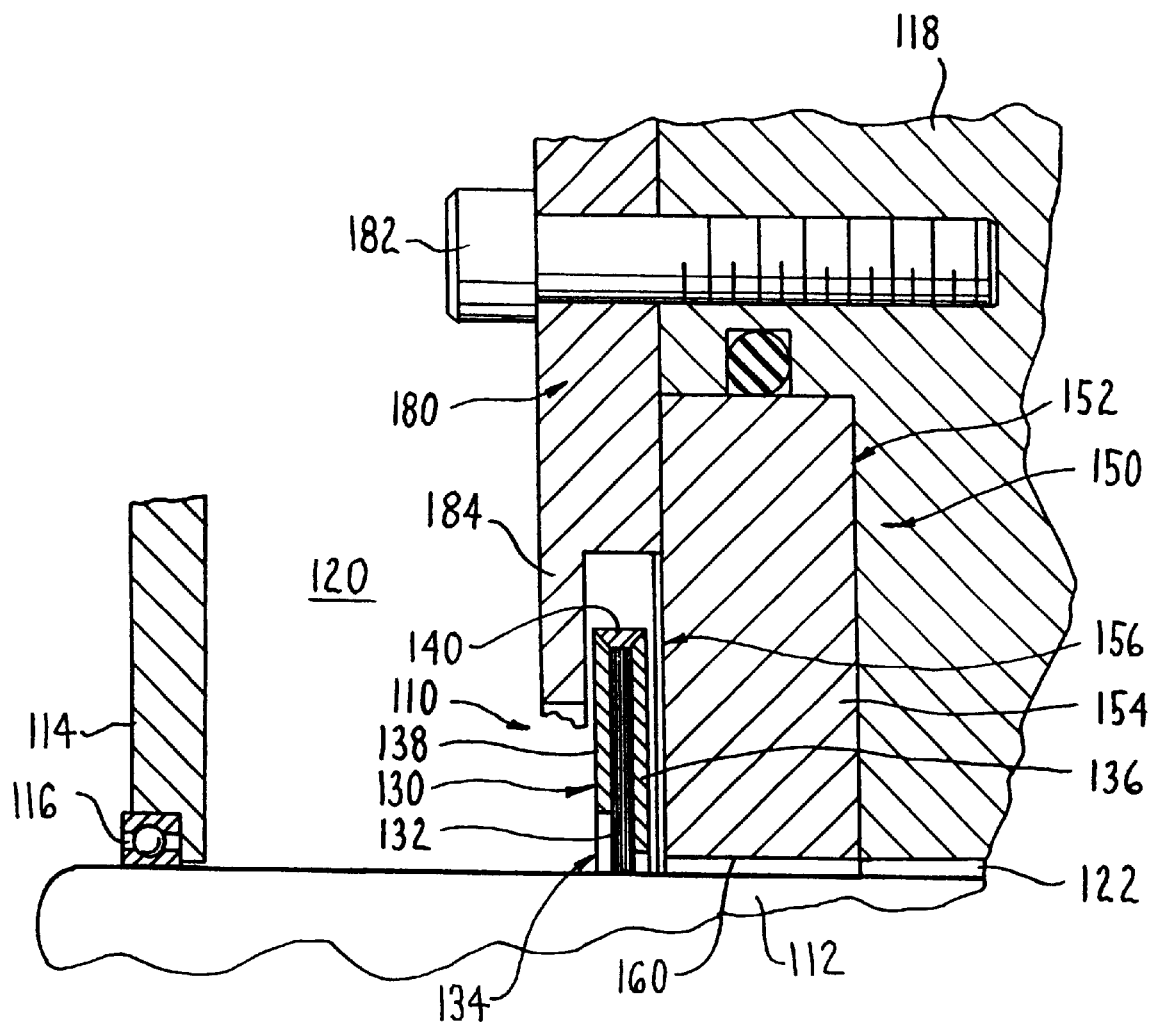
FIG. 1 is an enlarged, fragmentary cross-sectional view of a floating brush seal according to the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, there is illustrated a brush seal according to the present invention indicated generally by the numeral 110. The seal 110 encircles a shaft 112 that is rotatably supported in a nonrotating front panel 114 by a bearing 116. The shaft 112 also passes through a nonrotating back panel 118. An area of high pressure, indicated by the numeral 120, exists in front of and around the seal 110 while an area of low pressure, indicated by numeral 122, exists behind the seal 110. Thus, the seal 110 functions to substantially prevent fluid passage from the area of high pressure 120 to the area of low pressure 122. As will be subsequently described, the seal 110 accomplishes this by forming a primary seal and a secondary seal between the high pressure area 120 and the low pressure area 122.

The brush seal 110 includes a brush 130 that frictionally engages the shaft 112 such that there is no relative motion between the brush 130 and the shaft 112. The brush 130 includes a bristle portion 132 that is carried by a holder 134. The bristle portion 132 may be any one of the variety of bristle portions that are known in the art. In the preferred embodiment of the present invention, the bristle portion 132 is embodied by a plurality of bristles. In accordance with other embodiments of the invention, the bristle portion may be fabricated from a series of overlapping fingers. The holder 134 includes a back plate 136 and a front plate 138 connected to one another by a weld 140. The bristle portion 132 is sandwiched between the front and back plates 138 and 136.

An axial load-supporting device or face seal arrangement 150 is positioned adjacent to the back plate 136 of the holder 134. The axial load supporting device 150 creates a cushion of air between itself and the brush 130. Numerous types of axial load-supporting devices are known in the art, such as a self-acting film device that creates a cushion of air in response to relative motion between itself and the element to be supported. An example of a self-acting film device that may be used in accordance with the present invention is depicted in FIGS. 10 and 11 of related U.S. Pat. No. 5,997,004, and is known as a spiral groove seal.

As shown in FIG. 1, the seal 110 includes a spiral groove seal 152 having a body 154 on which a groove section 156 is etched. The groove section 156 includes a plurality of grooves which are circumferentially spaced-apart from one another about the body 154. This configuration creates a cushion of air when a flat surface rotates axially adjacent the groove section 156. The spiral groove seal 152 according to the present invention has an opening 160 configured to accept the shaft 112.

With continued reference to FIG. 1, the body 154 is nonrotatably carried by the back panel 118. The spiral groove seal 152 is disposed such that the groove section 156 is adjacent to the back plate 136 of brush holder 134. Both elements 136 and 156 have machined smooth surfaces that allow the two elements 136 and 156 to rotate against each other with minimal friction for a short time (i.e. a microsecond) and to rotate without friction at very close distances thereafter. It will be appreciated that the groove section 156 may, as is conventional, instead be provided on the back plate 136.

A shroud ring 180 is connected to the back panel 118 by a plurality of suitable connectors such as the mounting bolts 182 depicted in FIG. 1. The shroud ring 180 includes a lip 184 that extends inwardly from the shroud ring 180 toward the shaft 112. When the seal 110 is assembled, the lip 184 traps or confines the brush 130 between the spiral groove seal 152 and the shroud ring 180.

In operation, the brush 130 rotates with the shaft 112 due to the frictional forces between the bristle portion 132 and the shaft 112. The interface between the bristle portion 132 and the shaft 112 forms a primary seal between the high pressure area 120 and the low pressure area 122. The effectiveness of the primary seal may be adjusted by altering the materials and configuration of the bristle portion 132. The problems caused by high friction between the brush 130 and the shaft 112 are eliminated because the brush 130 substantially rotates along with the shaft 112 in accordance with the present invention. Although the brush 130 may slip on the shaft 112, the relative velocity between the shaft 112 and the brush 130 remains relatively low, and no (or very little) damage and/or wear occurs to the bristles.

As the back plate 136 rotates adjacent to the groove section 156 of the spiral groove seal 152, a film of air is created between the spiral groove seal 152 and the back plate 136. The film of air forces the brush 130 away from the spiral groove seal 152 in the direction of the lip 184 (i.e. leftwardly in FIG. 1). As the brush 130 moves, a small amount of leakage occurs between the high pressure area 120 and the low pressure area 122 through the gap between the back plate 136 and the groove section 156. The amount of leakage, however, is insignificant compared to the overall sealing effect of the seal 110. The amount of leakage is also limited by the presence of the lip 184 which acts to increase the pressure on the front plate 138 as the brush 130 approaches the lip 184. Thus, in operation, the brush 130 automatically adjusts its position between the lip 184 and the spiral groove seal 152 and forms a low leakage secondary seal.

While in operation, the shaft 112 may move either axially or radially essentially without disrupting the sealing effect. If the shaft 112 moves radially, the bristle portion 132 of the brush 130 accommodates the movement. If the shaft 112 moves axially in the direction of the back panel 118 (i.e. righwardly in FIG. 1), the back plate 136 is forced toward the spiral groove seal 152 thus creating a stiffer film. The stiffer film forces the brush 130 back toward the lip 184 and the sealing effect is not disrupted. If the shaft 112 moves axially in the direction of the lip 184 (i.e. leftwardly in FIG. 1), the pressure increases on the front plate 138 and the brush 130 is maintained adjacent to the spiral groove seal 152 so as to not disrupt the sealing effect. Thus, the plate 184 has a limiting effect on the movement of the brush 130.

Figure 2:
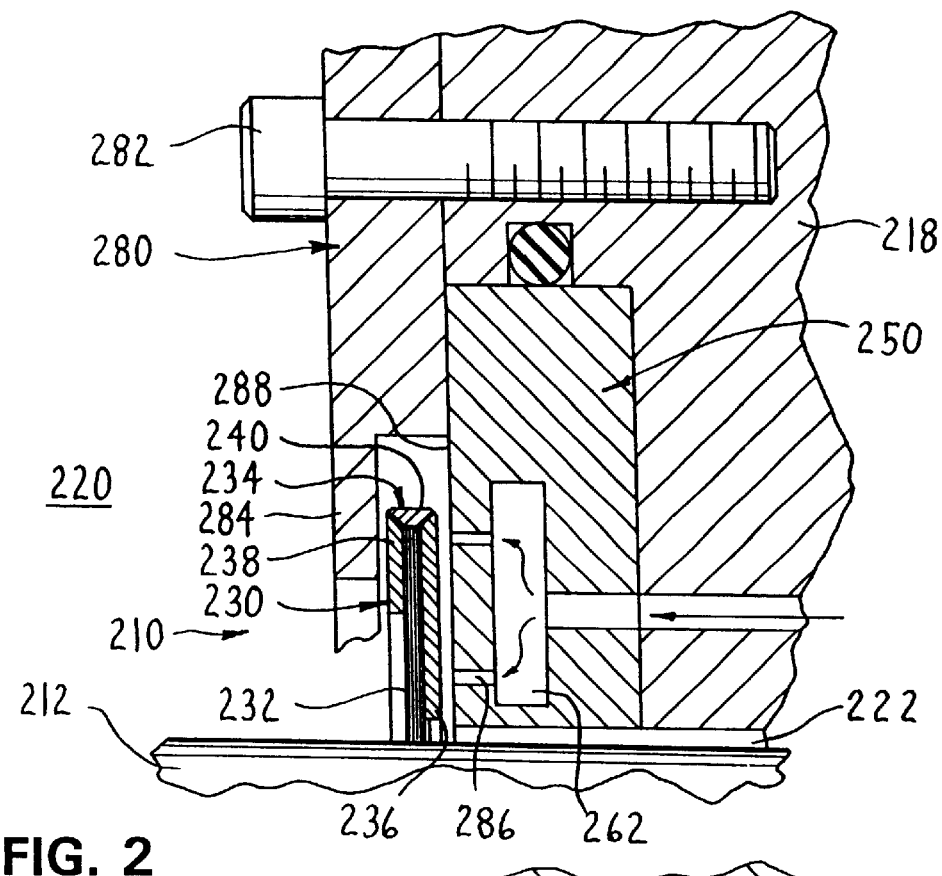
FIG. 2 is an enlarged, fragmentary, cross-sectional view of a floating brush seal according to a second embodiment of the invention.

FIG. 2 illustrates a second embodiment of the floating brush seal according to the invention, designated generally by the numeral 210. The seal 210 encircles a shaft 212 that is rotatably supported by a front panel (not shown) and passes through a back panel 218. An area of high pressure, indicated by the numeral 220, exists in front of the seal 210 while an area of low pressure, indicated by the numeral 222, exists behind the seal 210. Thus, the seal 210 functions to substantially prevent fluid passage from the area of high pressure 220 to the area of low pressure 222. As will be subsequently described, the seal 210 accomplishes this by forming a primary seal and a secondary seal between the high pressure area 220 and the low pressure area 222.

The floating brush seal 210 illustrated in FIG. 2 includes a brush 230 that frictionally engages the shaft 212. As may be seen in FIG. 2, the brush 230 includes a bristle portion 232 that is carried by a holder 234. The holder 234 includes a back plate 236 and a front plate 238 connected to one another by an end plate 240.

An axial load-supporting device or face seal arrangement 250 is positioned axially adjacent to the back plate 236 of the holder 234. The axial load-supporting device 250 includes a hydrostatic thrust seal 262 that is nonrotatably carried by the back panel 218. The hydrostatic thrust seal 262 includes a plurality of passages 286 that direct compressed gas (such as air) from a source of compressed air (not shown) toward the back plate 236. The face 288 of the hydrostatic thrust seal 262 has a machined smooth surface that allows the back plate 236 to rotate without friction at close distances, and still maintain a seal between the area of high pressure 220 and the area of low pressure 222.

A shroud ring 280 is connected to the back panel 218 by a plurality of suitable connectors such as the mounting screws 282 depicted in FIG. 2. The shroud ring 280 includes a lip 284 that extends inwardly from the shroud ring 280 toward the shaft 212. When the seal 210 is assembled, the lip 284 confines the brush 230 between the hydrostatic thrust seal 262 and the shroud ring 280.

The operation of the brush seal 210 will now be briefly discussed. The brush 230 rotates with the shaft 212 solely because of the frictional forces between the bristle portion 232 and the shaft 212. The interface between the bristle portion 232 and the shaft 212 forms a primary seal between the high pressure area 220 and the low pressure area 222. The effectiveness of the primary seal may be adjusted by altering the materials and configuration of the bristle portion 232. The problems due to high friction between the brush 230 and the shaft 212 are essentially eliminated because the brush 230 rotates along with the shaft 212 in the present invention.

The hydrostatic thrust seal 262 creates a film or cushion of air between the face 288 and the back plate 236 by directing compressed air between the two. The film of air forces the brush 230 away from the face 288 in the direction of the lip 284. As the brush 230 moves away from face 288, a small amount of leakage occurs between the high pressure area 220 and the low pressure area 222 through the gap between the back plate 236 and the face 288. The secondary seal is thus established. The amount of leakage, however, is insignificant compared to the overall sealing effect of the seal 210. The amount of leakage is limited by the presence of the lip 284 which acts to increase the pressure on the front plate 238 as the brush 230 approaches the lip 284. Thus, in operation, the brush 230 automatically adjusts its axial position between the lip 284 and the face 288 and forms a secondary seal.

While in operation, the shaft 212 may move either axially or radially without disrupting the sealing effect. If the shaft 212 moves radially, the bristle portion 232 of the brush 230 accommodates the movement. If the shaft 212 moves axially in the direction of the back panel 218, the back plate 236 is forced toward the face 288 creating a stiffer film. The stiffer film forces the brush 230 back toward the lip 284 and the sealing effect is not disrupted. If the shaft 212 moves axially in the direction of the lip 284, the pressure increases on the front plate 238 and the brush 230 is maintained adjacent to the face 288 as to not disrupt the sealing effect.

Figure 3:
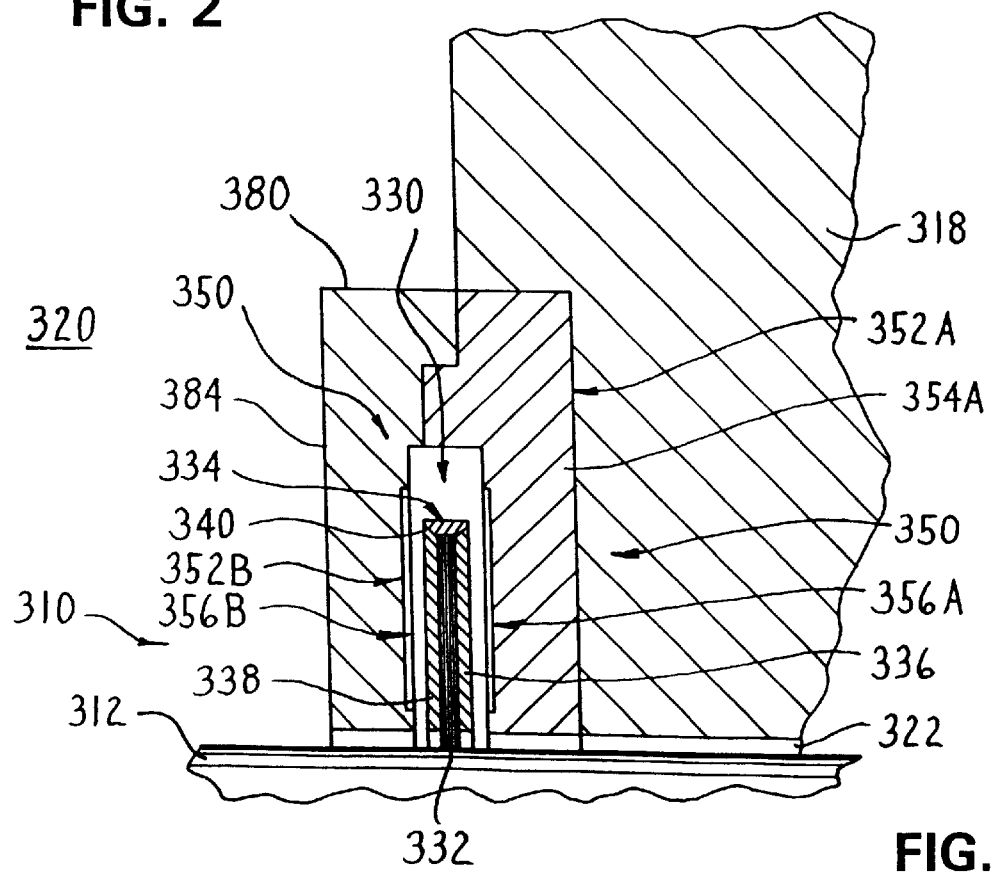
FIG. 3 is an enlarged, fragmentary, cross-sectional view of a floating brush seal according to a third embodiment of the invention.

FIG. 3 illustrates a third embodiment of the floating brush seal according to the invention, designated generally by the numeral 310. The seal 310 encircles a shaft 312 that is rotatably supported by a front panel (not shown) and passes through a back panel 318. An area of high pressure, indicated by the numeral 320, exists in front of the seal 310 while an area of low pressure, indicated by the numeral 322, exists behind the seal 310. The seal 310 functions to substantially prevent fluid passage from the area of high pressure 320 to the area of low pressure 322 by forming a primary seal and a secondary seal between the high pressure area 320 and the low pressure area 322.

The floating brush seal 310 shown in FIG. 3 includes a brush 330 having a bristle portion 332 that is carried by a holder 334. The brush includes a back plate 336 and a front plate 338 connected by a weld 340. The holder 334 shown in FIG. 3 differs from the holders 134 and 234 of the embodiments of FIGS. 1 and 2 in that the front plate 338 thereof is approximately the same height as the back plate 336 thereof.

A pair of axial load-supporting devices 350 or face seal members are respectively positioned adjacent the back plate 336 and the front plate 338. Each axial load-supporting device 350 includes a spiral groove seal having a body and a groove section. Spiral groove seal 352A includes a body 354A defining a groove section 356A, which body 354A is carried by the back panel 318. Spiral groove seal 352B is carried by a shroud ring 380 which defines a groove section 356B thereon. Spiral groove seal 352A is disposed such that the groove section 356A thereof is axially adjacent the back plate 336. Spiral groove seal 352B is disposed such that the groove section 356B thereof is axially adjacent the front plate 338. Each spiral groove seal 352A and 352B and the faces of the front plate 338 and the back plate 336 have machined smooth surfaces that allow rotation without friction at close distances.

The shroud ring 380 is connected to the back panel 318 by a suitable connector such as the interlocking arrangement depicted in FIG. 3. The shroud ring 380 includes a lip 384 that extends inwardly in the direction of the shaft 312. The lip 384 has formed therein the spiral groove seal 352B adjacent to the front plate 338. When the seal 310 is assembled, the lip 384 traps the brush 330 between both spiral grooves seals 352A and 352B.

The operation of the floating brush seal 310 will now be briefly described. The brush 330 substantially rotates with the shaft 312 solely due to the frictional forces between the bristle portion 332 and the shaft 312. The interface between the bristle portion 332 and the shaft 312 forms a primary seal between the high pressure area 320 and the low pressure area 322. The effectiveness of the primary seal may be adjusted by altering the materials and configuration of the bristle portion 332. The problems high friction between the brush 330 and the shaft 312 are thus eliminated because the brush 330 substantially rotates with the shaft 312 in the present invention. Although some slipping may occur between the bristle portion 332 and the shaft 312, the relative velocity between the two remains relatively low.

As brush 330 rotates adjacent to the groove sections 356A and 356B of the respective spiral groove seals 352A and 352B, a film of air is created between the groove section 356A and the back plate 336, and also between the groove section 356B and the front plate 338. Thus, in operation, the films of air on either side of the holder 334 automatically adjust the position of the brush 330 and function as a secondary seal.

While in operation, the shaft 312 may move either axially or radially without disrupting the sealing effect. If the shaft 312 moves radially, the bristle portion 332 of the brush 330 accommodates the movement. If the shaft 312 moves axially in the direction of the back panel 318, the back plate 336 is forced toward the groove section 356A creating a stiffer film. The stiffer film forces the brush 330 toward the lip 384. If the shaft 312 moves axially in the direction of the lip 384, the groove section 356B on the lip 384 creates a stiffer film in front of the front plate 338 forcing the brush 330 back towards the back plate 318. In either case, the sealing effect is not disrupted.

It will be appreciated that in the above discussed embodiments which utilize a spiral groove seal, the groove section may, as is conventional, be formed on either the rotating or the stationary seal face member.

Figure 4:
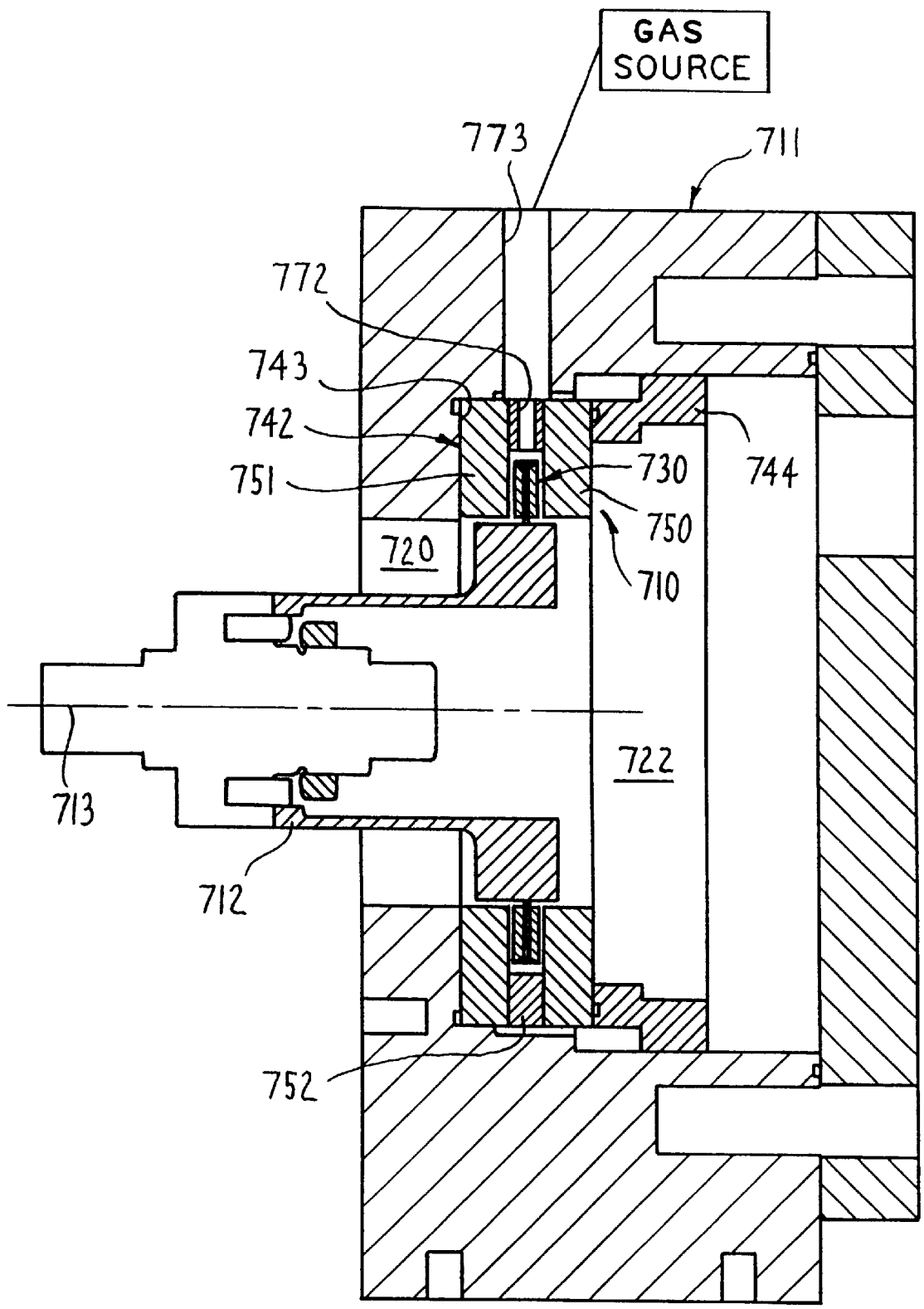
FIG. 4 is a cross-sectional view of a fourth embodiment of the invention.
Figure 5:
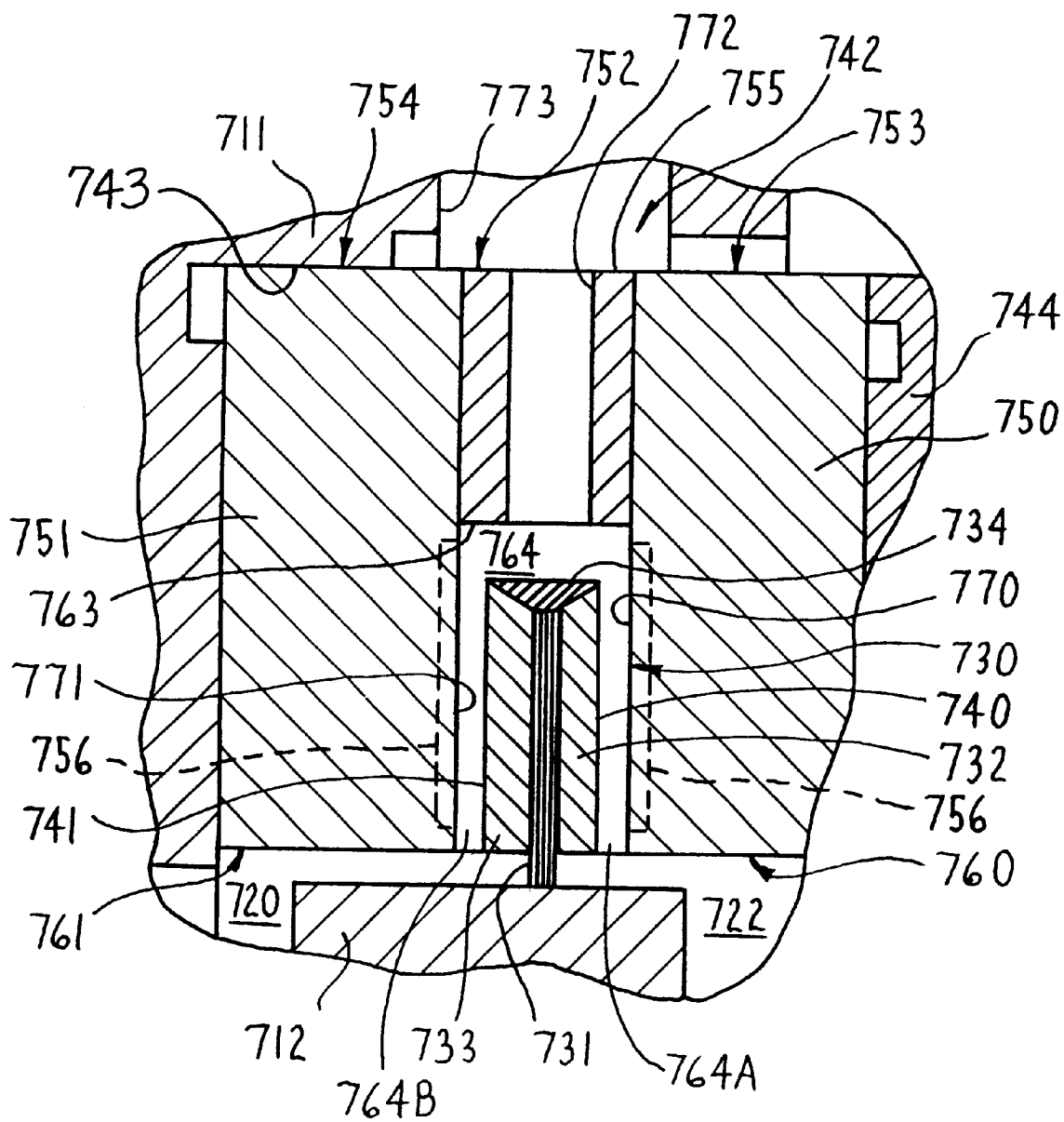
FIG. 5 is an enlarged detail of the face seal arrangement and brush of FIG. 4.

FIGS. 4 and 5 illustrate a fourth embodiment of a seal assembly according to the invention, designated by the numeral 710. The seal assembly 710 is disposed for cooperation between a stationary housing or housing member 711 and a shaft 712, which shaft 712 is supported for rotation on housing 711 about its axis 713. The seal assembly 710 is disposed in surrounding relationship to the shaft 712 and creates a seal between an area of low pressure 720 and an area of high pressure 722. The seal assembly 710 functions to substantially prevent fluid passage from the area of high pressure 722 to the area of low pressure 720 by means of a primary seal and a secondary seal as discussed below.

The seal assembly 710 includes a free-floating annular brush 730 which frictionally engages the shaft 712 for rotation therewith. As best shown in FIG. 5, the annular brush 730 includes a bundle or plurality of bristles 731 which are sandwiched between and held in place by a pair of opposed annular holder plates 732 and 733. Plates 732 and 733 are fixed to one another at outer peripheries thereof, for example by a weld 734. Each plate 732 and 733 respectively defines thereon a generally radially extending, flat, annular sealing face 740 and 741, which sealing faces 740 and 741 face outwardly and away from bristles 731. The annular brush 730 is arranged such that the radially inner free ends of the bristles 731 frictionally engage the shaft 712 and make sealing contact therewith to form the primary seal between the areas of high and low pressure 722 and 720, respectively.

The seal assembly 710 additionally includes an annular face seal arrangement or structure 742 which is exteriorly surrounded and nonrotatably carried by the housing 711. Face seal arrangement 742 is located within a recess 743 of the housing 711 and is axially fixed in recess 743 by a housing ring 744. The face seal arrangement 742 includes a pair of annular plate-like seal members 750 and 751 which are axially spaced from one another by a ring 752 disposed therebetween. The plate-like members 750 and 751 each have a generally axially extending, flat outer peripheral edge surface 753 and 754, respectively, which surfaces 753 and 754 are arranged in the illustrated embodiment so as to be substantially flush with a generally axially extending, flat outer peripheral edge surface 755 of ring 752 (i.e. the diameters of peripheral edge surfaces 753, 754 and 755 are approximately equal to one another). Further, plate-like members 750 and 751 each have generally axially extending inner peripheral edge surfaces 760 and 761, respectively, which surfaces 760 and 761 have similar diameters. Ring 752 also includes a generally axially extending inner peripheral edge surface 763 having a diameter which is greater than the outer diameter of brush 730. The diameter of edge surface 763 is also greater than the diameters of inner edge surfaces 760 and 761 of plate-like members 750 and 751, such that a radially extending cavity 764 is formed between plate-like members 750 and 751.

Each plate-like member 750 and 751 defines thereon an inwardly facing, radially extending, flat annular sealing face 770 and 771, respectively. The sealing faces 770 and 771, along with inner edge surface 763 of ring 752, define cavity 764. Annular brush 730 is disposed in a free-floating manner within the cavity 764. Sealing faces 770 and 771 are disposed in axially adjacent and opposed face-to-face sealing relationship with the respective sealing faces 740 and 741 of the annular brush 730 such that a secondary seal is formed between the respective areas of high and low pressure 722 and 720.

The ring 752 of face seal arrangement 742 includes therein a passage 772 which extends radially and completely through ring 752 between the inner and outer peripheral edge surfaces 763 and 755 thereof so as to communicate with cavity 764. Passage 772 additionally communicates with a radially extending passage 773 of housing 711 located radially outwardly from face seal arrangement 742. Passage 772 of face seal arrangement 742 and passage 773 of housing 711 are configured and disposed to direct gas (such as air) from a gas source (shown schematically only in FIG. 4) into cavity 764. Additional passages similar to passages 772 and 773 may be provided at spaced-apart circumferential intervals within face seal arrangement 742 and housing 711, respectively.

In operation, the annular brush 730 is carried along (or entrained) with the shaft 712 so as to rotate therewith due to frictional forces between the free ends of the bristles 731 and the shaft 712. The interface between the bristles 731 and shaft 712 forms the primary seal between the areas of high and low pressure 722 and 720. Although some slippage may occur between the brush bristles 731 and the shaft 712, the difference in velocity therebetween is normally relatively low, thereby avoiding wear to the bristles 731 and, more importantly, to the shaft 712.

A gas film is created between the opposed pairs of sealing faces 740, 770 and 741, 771 by the compressed gas directed into cavity 764 via passages 773 and 772 of housing 711 and face seal arrangement 742, respectively. The compressed gas then continues into each of the spaces 764A and 764B of cavity 764 defined between the opposed pairs of sealing faces 740, 770 and 741, 771. In this regard, gas is preferably directed into cavity 764 at a slightly higher pressure than the process pressure (i.e. the pressure of high pressure area 722) so that the pairs of opposed sealing faces 740, 770 and 741, 771 are maintained spaced from one another to form a non-contacting secondary seal between the areas of high and low pressure 722 and 720. Further, the relative motion between sealing faces 740, 770 and 741, 771 enhances the hydrostatic pressure of the gas fed into cavity 764. The gas film formed between the opposed sealing faces hence creates a small, stiff gap therebetween and prevents direct contact of the seal faces with one another which minimizes face seal wear. In addition, the air discharged radially inwardly from passage 772 into cavity 764 and onto the brush 730 serves to provide radial support to brush 730 which floats the brush 730 in the radial direction and substantially prevents radial contact thereof with face seal arrangement 742, and specifically edge surface 763 thereof.

While in operation, the shaft 712 may move radially, in which case the bristles 731 accommodate the movement by bending or slipping relative to the shaft 712, or the entire brush 730 can be displaced radially with the shaft 712. If the shaft 712 moves axially during operation towards the left in FIGS. 4 and 5, brush 730 and sealing face 741 move axially towards the opposed sealing face 771 which creates a stiffer air film between sealing faces 741 and 771 and forces the brush 730 back towards the right. If the shaft 712 moves axially during operation towards the right in FIGS. 4 and 5, brush 730 and thus sealing face 740 move axially towards the opposed sealing face 770 which creates a stiffer air film between sealing faces 740 and 770 and forces the brush 730 back towards the left. Thus, the brush 730 is balanced axially between the sealing faces 770 and 771 and allows shaft 712 to slip relative to the bristles 831 during axial movement of shaft 712. In addition, the above-mentioned stiffer air film between the opposed sealing faces prevents further axial movement of the brush in either the right (for a rightward shaft movement) or left (for a leftward shaft movement) direction. The seal assembly 710 therefore accommodates axial and radial shaft movements, and the primary and secondary seals are essentially not disrupted during such movements.

In accordance with an additional embodiment, one of opposed sealing faces 740 and 770, and one of opposed sealing faces 741 and 771, may be provided with grooves 756 (shown in dotted lines in FIG. 5), for example similar to grooves 56 shown in FIGS. 10 and 11 of related U.S. Pat. No. 5,997,004, so as to assist in forming a gas film between the opposed pairs of sealing faces 740, 770 and 741, 771 during relative rotation thereof.

Figure 6:
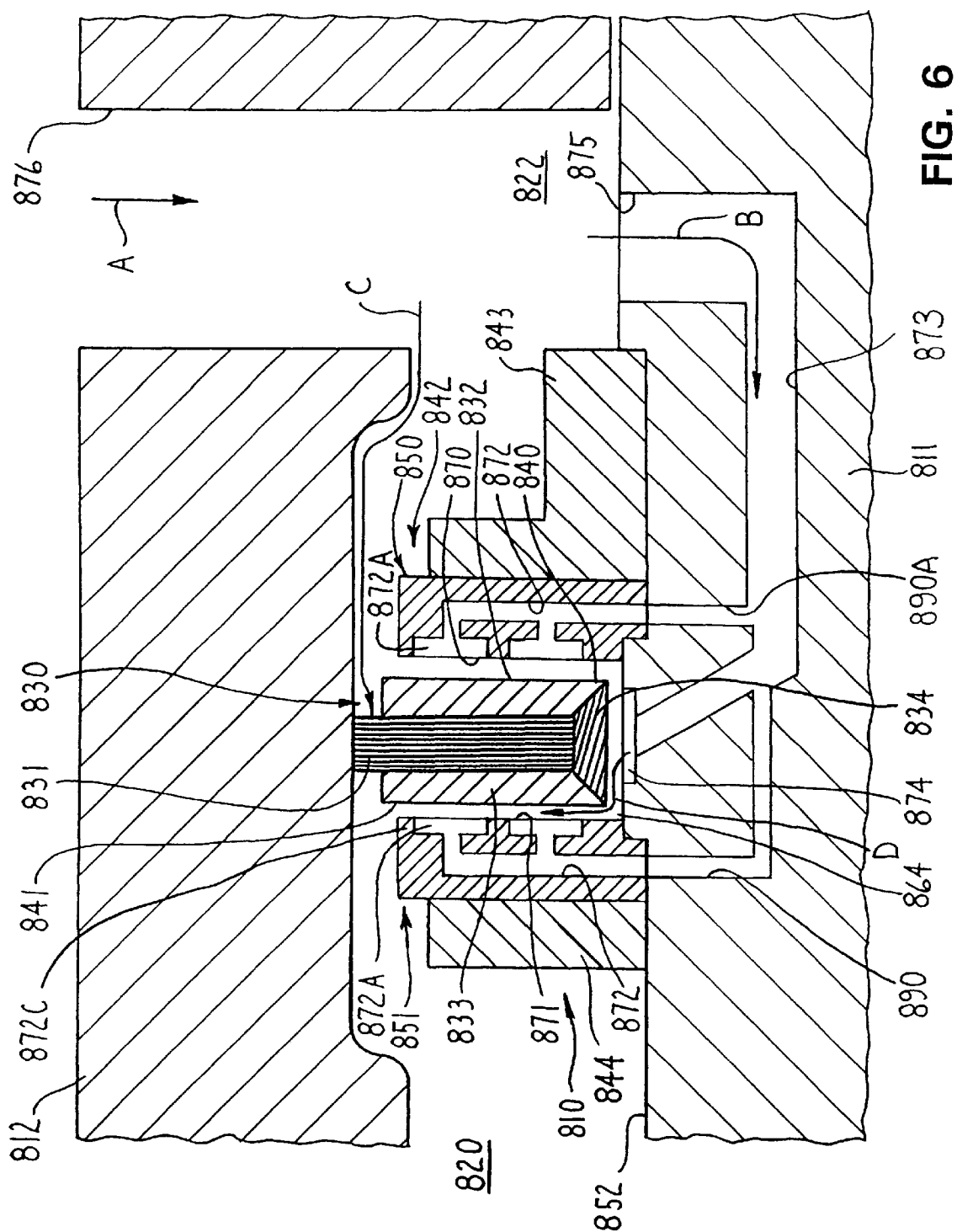
FIG. 6 is a fragmentary cross-sectional view of a fifth embodiment of the invention.

FIG. 6 illustrates a fifth embodiment of the seal assembly according to the invention, designated by the numeral 810. The seal assembly 810 is disposed for cooperation between an inner shaft member 811 and an outer housing member 812. In the illustrated embodiment, the outer housing member 812 is embodied by a shaft sleeve arranged generally concentrically about inner shaft member 811. Inner and outer shaft members 811 and 812 are relatively rotatable, and may rotate in the same direction or may be counter-rotating.

The seal assembly 810 is disposed in surrounding relationship with the inner shaft member 811 and creates a seal between an area of low pressure 820 and an area of high pressure 822. The seal assembly 810 functions to prevent the passage of fluid, gas, or a mixture thereof from the area of high pressure 822 to the area of low pressure 820 by means of a primary seal and a secondary seal as discussed below.

The seal assembly 810 includes a free-floating annular brush 830 which surrounds inner shaft member 811 and frictionally engages the outer shaft member 812 for rotation therewith. The brush 830 includes a bundle or plurality of bristles 831 which are sandwiched between and held in place by a pair of opposed annular holder plates 832 and 833. Plates 832 and 833 are fixed to one another at inner peripheries thereof, for example by a weld 834. Each plate 832 and 833 respectively defines thereon a generally radially extending, flat, annular sealing face 840 and 841, which sealing faces 840 and 841 face outwardly and away from bristles 831. In the embodiment shown in FIG. 14, the annular brush 830 is arranged such that the radially outer free ends of the bristles 831 frictionally engage the outer shaft member 812 and make sealing contact therewith to form the primary seal between the areas of high and low pressure 822 and 820, respectively.

The seal assembly 810 additionally includes an annular face seal arrangement or structure 842 which exteriorly surrounds, and is nonrotatably carried by, the inner shaft member 811. Face seal arrangement 842 is axially fixed on inner shaft member 811 by a pair of annular holder rings 843 and 844 fixed on inner shaft member 811 and arranged on either side of face seal arrangement 842. The face seal arrangement 842 includes a pair of annular plate-like manifold rings 850 and 851 which are fixed to an outer surface 852 of inner shaft member 811 and are axially spaced from one another such that a radially extending cavity 864 is defined therebetween. Each manifold ring 850 and 851 defines thereon an inwardly facing, radially extending, flat annular sealing face 870 and 871, respectively. The sealing faces 870 and 871 are disposed in axially adjacent and opposed face-to-face sealing relationship with the respective sealing faces 840 and 841 of the annular brush 830 such that a secondary seal is formed between the respective areas of high and low pressure 822 and 820.

The manifold rings 850 and 851 each include a network of interconnected passages 872 therein which open at pockets 872A disposed within the respective sealing faces 870 and 871 so as to communicate with cavity 864. The pockets 872A are uniformly distributed in the circumferential direction about the respective sealing faces 870 and 871. Alternatively, pockets 872A may be embodied by continuous grooves which extend annularly within seal faces 870 and 871 and open into cavity 864 and also communicate with passages 872. Manifold rings 850 and 851 each also include an annular, non-grooved dam region 872C adjacent the radially outer end of the interface between the opposed sealing faces 840, 870 and 841, 871 for a purpose as discussed below.

As shown in FIG. 6, inner shaft member 811 includes a generally axially extending feed passage 873 located radially inwardly from face seal arrangement 842. The feed passage 873 opens into cavity 864 at one end via an air pocket 874 formed in the outer surface 852 of inner shaft member 811 adjacent the radially inner end of annular brush 830, and at the opposite end 875 opens into the high pressure area 822. The end 875 of feed passage 873 in turn communicates with a feed passage 876 extending generally radially within outer shaft member 812. Inner shaft member 811 also includes feed channels 890 and 890A which extend between feed passage 873 and manifold passages 872 to permit communication therebetween. More specifically, feed channels 890, 890A have inner ends which open into feed passage 873, and outer ends which open at the outer surface 852 of inner shaft member 811 adjacent the radially inner ends of manifold passages 872 for communication therewith.

Additional passages (not shown) similar to feed passages 873 and the associated feed channels 890, 890A, and also feed passage 876 may be provided at spaced-apart circumferential intervals within the respective inner and outer shaft members 811 and 812. Passages 873 and 876 and channels 890, 890A direct high pressure gas (such as air) from the high pressure area 822 into cavity 864 as discussed below.

In operation, high pressure gas is fed into passage 876 as indicated by arrow A and flows into passage 873 of inner shaft member 811 as indicated by arrow B, and also flows radially outwardly of the seal assembly 810 as indicated by arrow C. The brush 830 rotates along with outer shaft member 812 due to frictional forces between the free ends of the bristles 831 and the outer shaft member 812 and thus leakage along path C from the high pressure area 822 to the low pressure area 820 is prevented. The interface between the bristles 831 and outer shaft member 812 forms the primary seal between the areas of high and low pressure 822 and 820. Although some slip may occur between the brush 830 and the outer shaft member 812, particularly during start-up, the difference in velocity therebetween is normally relatively low, thereby avoiding wear to the bristles 831, and more importantly, to the outer shaft member 812.

The high pressure gas flowing within passage 873 enters the cavity 864 via pocket 874 which serves to float brush 830 in the radial direction and prevent contact between the radially inner end of brush 530 and the inner shaft member 811.

The high pressure gas from feed passage 873 also flows into manifold passages 872 via the feed channels 890, 890A. This gas or air is then discharged against the respective plates 832 and 833 of brush 830 via pockets 872A which serves to create a thin film of gas or air between the respective pairs of sealing faces 840 and 870, and 841 and 871, so that the opposed pairs of sealing faces are maintained spaced from one another and form a non-contacting secondary seal between the areas of high and low pressure 822 and 820. Thus, brush 830 is radially and axially supported (and also substantially centered and balanced) by the gas discharged from passage 873 and rotates along with outer shaft member 812 essentially without contact with either the face seal arrangement 842 or the inner shaft member 811. Further, the gas film created between the opposed pairs of sealing faces 840, 870 and 841, 871 creates a small gap therebetween and prevents direct contact of the sealing faces with one another so as to minimize face seal wear.

With regard to the secondary seal formed by the opposed pairs of sealing faces 840 and 870, and 841 and 871, it will be appreciated that high pressure gas leaks from pocket 874 between opposed sealing faces 841 and 871 on the low pressure side of the seal assembly 810 as indicated by arrow D, and since the clearance between sealing faces 841 and 871 is narrow and presents a high resistance to flow, the aforementioned secondary seal is primarily achieved between sealing faces 841 and 871. In addition, the outer peripheral portions 872C of manifold rings 850, 851, and particularly peripheral portion 872C of manifold ring 851 on the low pressure side, each act as a dam to further increase flow resistance between the opposed pairs of sealing faces 840 and 870, and 841 and 871 to make the secondary seal even more efficient.

The above discussed embodiment accommodates radial or axial movement of the inner and outer shaft members 811 and 812 relative to one another essentially without disruption and wear of the primary and secondary seals. For example, if inner shaft member 811 moves radially toward outer shaft member 812, the bristles 831 are compliant so as to accommodate the movement, or the entire brush 830 can be displaced radially with the inner shaft member 811. The same is true in the case where the outer shaft member 812 moves radially toward the inner shaft member 811 (i.e. the bristles 831 comply and mitigate the motion or the entire brush 830 can be displaced radially with the outer shaft member 812). If the inner shaft member 811 moves radially away from the outer shaft member 812, the bristles 831 will stay in contact with the outer shaft member 812. The same is true if the outer shaft member 812 moves radially away from inner shaft member 811.

Further, if either the inner or outer shaft member 811 or 812 moves axially relative to the other, a stiffer gas or air film is created between the corresponding sealing faces 840, 870 or 841, 871 depending upon which direction (i.e. right or left in the figures) the shaft member moves, as discussed above, which stiffer gas film prevents further axial movement of the brush 830 in the corresponding direction. Thus, during axial movement of either shaft member 811 or 812, the brush 830 is axially balanced between sealing faces 770 and 771 and allows the shaft to slip relative to the bristles 831 without disruption of either the primary or secondary seals.

Figure 7:
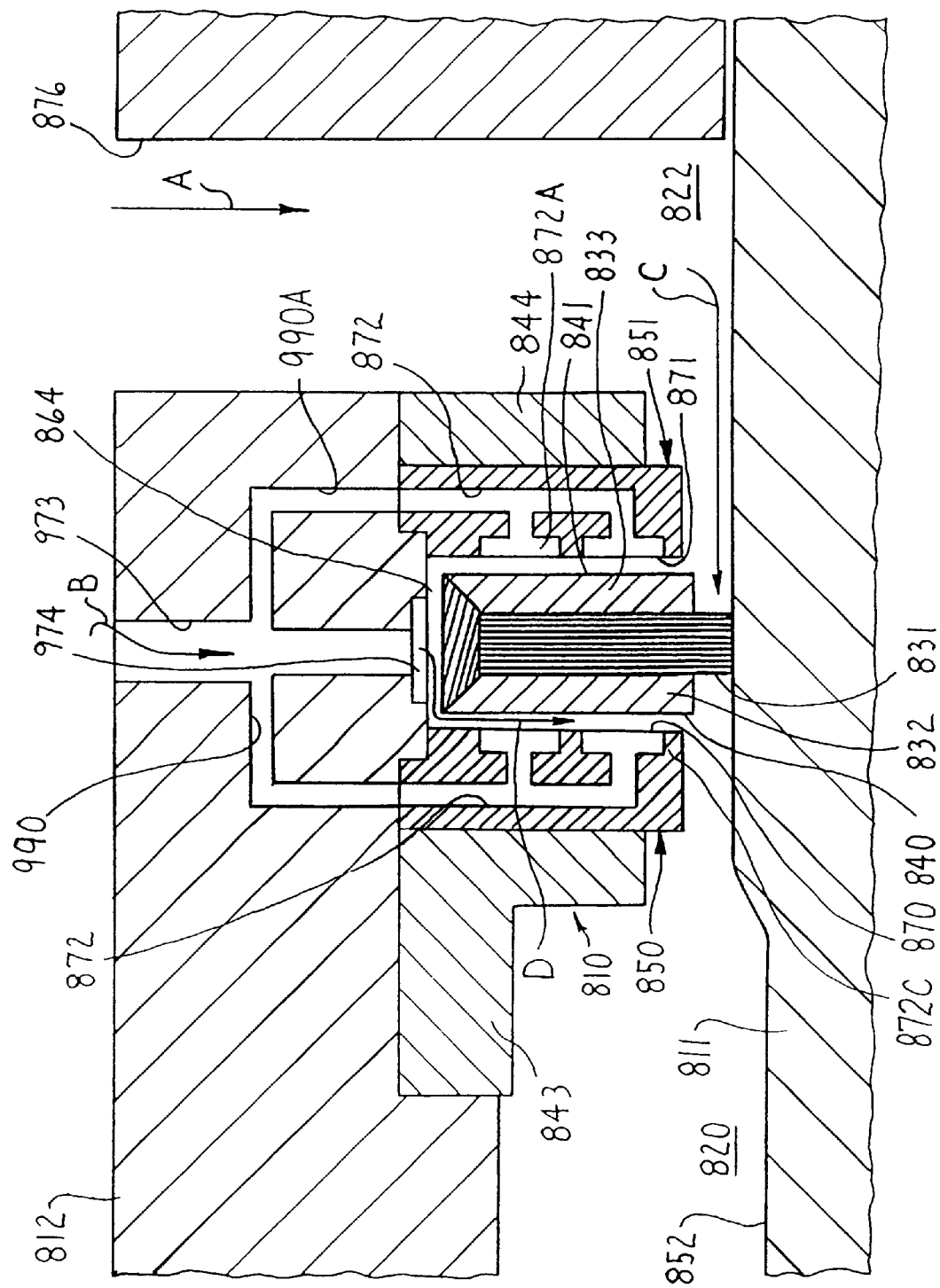
FIG. 7 is a fragmentary cross-sectional view of a sixth embodiment of the invention.

FIG. 7 illustrates a sixth embodiment according to the invention which is similar to the embodiment illustrated in FIG. 6. The same reference numbers are thus utilized for the same or similar structures. The embodiment shown in FIG. 7 differs from the embodiment shown in FIG. 6 in that the holder rings 843 and 844 and also the manifold rings 850 and 851 are carried by the outer shaft member 812 for rotation therewith, and the bristles 831 of annular brush 830 make sealing contact with the outer surface 852 of inner shaft member 811. Brush 830 thus rotates with inner shaft member 811 during operation. Further, one or more generally radially extending feed passages 973 are disposed within outer shaft member 812, which passage 973 at one end opens into cavity 864 via an air pocket 974 formed radially outwardly of the brush 830, and at the opposite end communicates with the high pressure area 822. In addition, outer shaft member 812 also includes feed channels 990 and 990A having outer ends which open into feed passage 973, and inner ends which open adjacent the radially outer ends of manifold passages 872 for communication therewith.

The operation of the embodiment of FIG. 7 is essentially the same as the operation of the embodiment of FIG. 6. High pressure gas is simultaneously fed into both passages 876 and 973 as indicated by arrows A and B. The high pressure air or gas flowing within passage 973 enters cavity 864 via pocket 974, and also via feed channels 990, 990A, manifold passages 872 and pockets 872A, and operates to support the brush 830 axially and radially as discussed above. The present embodiment also accommodates radial or axial movement of the inner and outer shaft members 811 and 812 relative to one another as discussed above.

Figure 8:
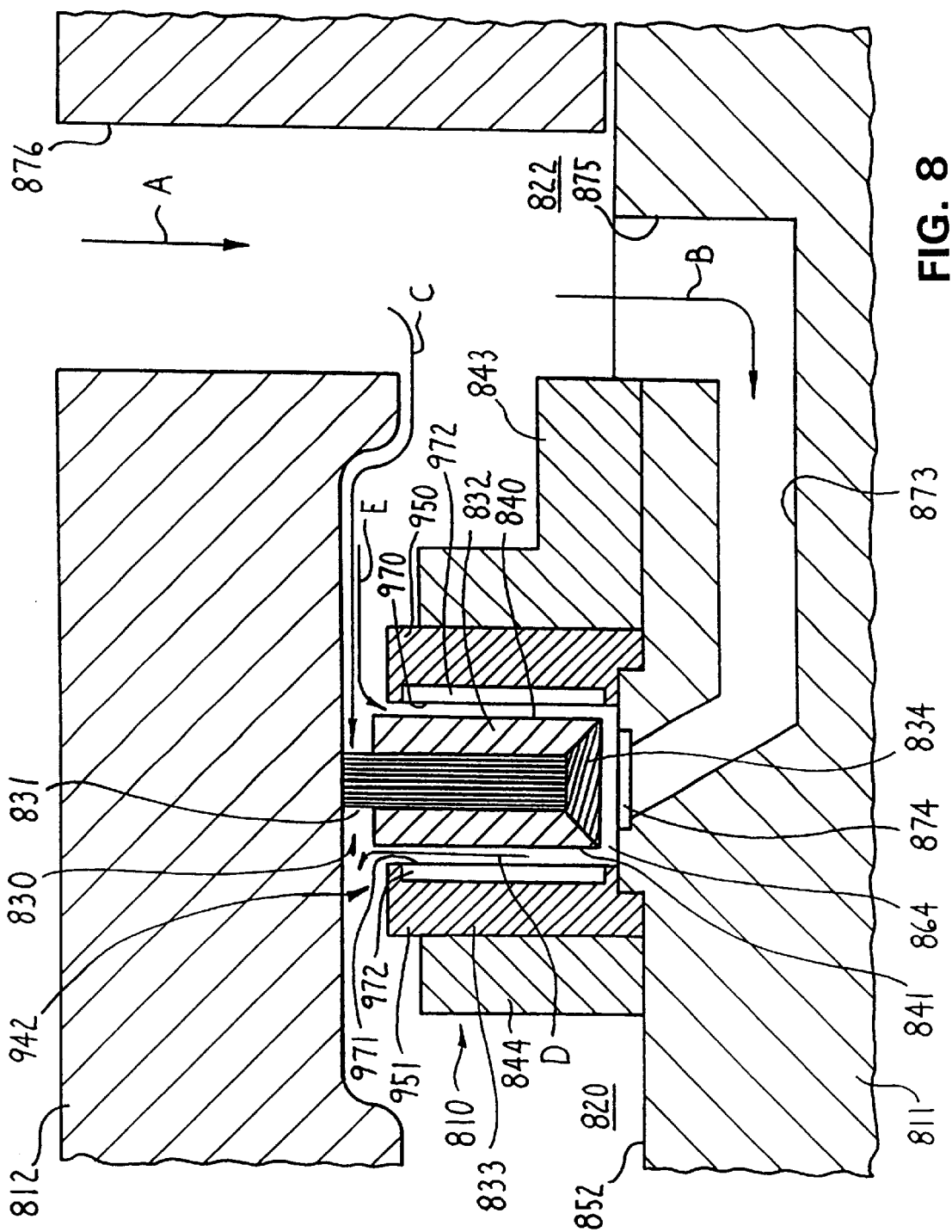
FIG. 8 is a fragmentary cross-sectional view of a seventh embodiment of the invention similar to the embodiment shown in FIG. 6, but which incorporates a spiral groove seal.

A seventh embodiment according to the invention is illustrated in FIG. 8 and is similar to the embodiment shown in FIG. 6, and therefore the same reference numbers are utilized to depict the same or similar structures. The embodiment of FIG. 8 differs from the embodiment shown in FIG. 6 in that the face seal arrangement 942 includes a pair of annular, plate-like seal members 950 and 951 disposed on either side of brush 830, which seal members 950 and 951 respectively include an inwardly facing, generally radially extending, flat, annular sealing face 970 and 971 having grooves 972 therein. Grooves 972 preferably constitute spiral groove seals and are similar to grooves 56 shown in FIGS. 10 and 11 of related U.S. Pat. No. 5,997,004 and serve to form a gas film between the opposed pairs of sealing faces 840, 970 and 841, 971 during relative rotation thereof.

In operation, high pressure gas is fed into passage 876 as indicated by arrow A and flows into passage 873 of inner shaft member 811 as indicated by arrow B, and also flows radially outwardly of the seal assembly 810 as indicated by arrow C. The brush 830 rotates along with outer shaft member 812 due to frictional forces between the free ends of bristles 831 and outer shaft member 812 to form the primary seal and prevent leakage across path C. The high pressure air flowing within passage 873 enters cavity 864 via pocket 874 which floats brush 830 radially and prevents contact between the brush 830 and inner shaft member 811.

The high pressure gas also enters cavity 864 between opposed sealing faces 840 and 970 as indicated by arrow E, leaks between opposed sealing faces 840 and 970, and merges with the pressurized gas discharged radially from pocket 874. The two merged gas streams then continue to flow between opposed sealing faces 841 and 971 as indicated by arrow D to cause leak of gas between opposed sealing faces 841 and 971. The thin gas films created by the air flowing between opposed pairs of sealing faces 840, 970 and 841, 971 serves to maintain the opposed sealing faces spaced from one another so that a non-contacting secondary seal is formed between the areas of high and low pressure 822 and 820.

As with the embodiment of FIG. 6, it will be appreciated that the aforementioned secondary seal is primarily achieved between sealing faces 841 and 971 on the low pressure side of the seal assembly 810 due to the minimal clearance between the sealing faces 841, 971 which provides a high flow resistance. The present embodiment also accommodates radial or axial movement of the inner and outer shaft members 811 and 812 relative to one another as discussed above.

Figure 9:
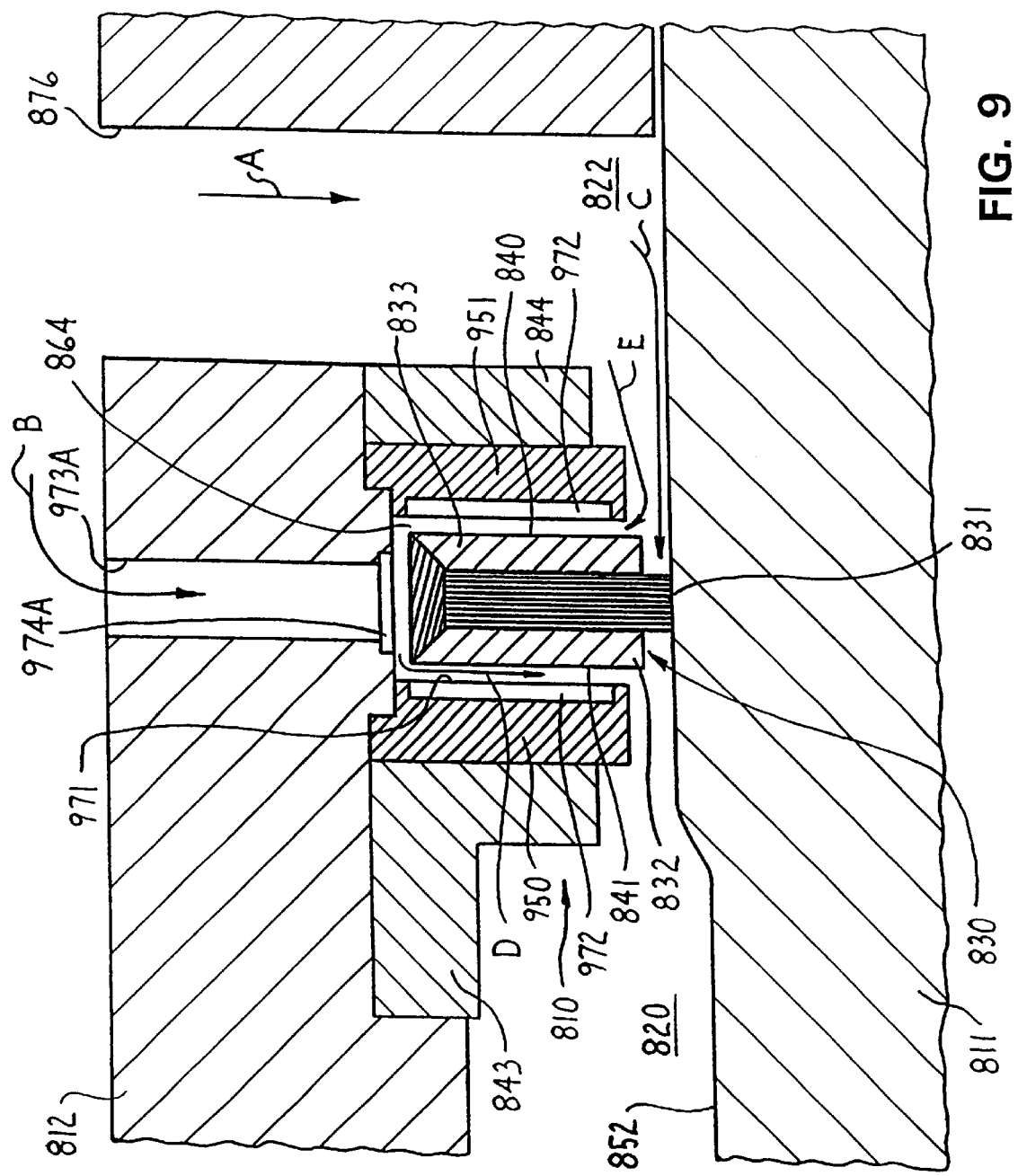
FIG. 9 is a fragmentary cross-sectional view of an eighth embodiment of the invention similar to the embodiment shown in FIG. 7, but which incorporates a spiral groove seal.

FIG. 9 illustrates an eighth embodiment of the invention which is similar to the embodiment of FIG. 8, except that the holder rings 843 and 844 and also the seal members 950 and 951 are carried by the outer shaft member 812 for rotation therewith, and the bristles 831 of brush 830 make sealing contact with the outer surface 852 of inner shaft member 811. Brush 830 thus rotates with inner shaft member 811 during operation. Further, one or more radially extending feed passages 973A are disposed within outer shaft member 812, which passage 973A opens at one end into cavity 864 via an air pocket 974A formed radially outwardly of brush 830, and at the opposite end communicates with high pressure area 822.

The operation of the embodiment of FIG. 9 is essentially the same as the operation of the embodiment of FIG. 8. High pressure gas is fed into both passages 876 and 973A substantially simultaneously as indicated by arrows A and B. The high pressure gas flowing within passage 973A enters cavity 864 via pocket 974A and operates to support the brush 830 axially and radially as discussed above.

It will be appreciated that grooves similar to grooves 972 of sealing members 950 and 951 in the embodiments illustrated in FIGS. 8 and 9 may alternatively be provided on the holder plates 950 and 951 within sealing faces 840 and 841 thereof.

It will also be appreciated that the seal assemblies illustrated in FIGS. 6–9 may be utilized to seal between two shaft members which rotate in either the same direction or opposite directions, or alternatively may be utilized to seal between a stationary component such as a housing or housing member and a component which rotates relative thereto, such as a shaft.

Further, the seal assemblies illustrated in FIGS. 6–9 may be utilized to seal between two single-phase (i.e. gas) environments or between two different environments such as a single-phase (gas) environment and a two-phase environment (i.e. a mixture of gas and oil mist).

In addition, feeding high pressure gas or air into the above-described passages in inner and outer shaft members and also within the seal assembly either from an independent pressurized gas source (having a higher pressure than the process pressure) as in FIGS. 4 and 5, or from the high pressure side of the seal as in FIGS. 6–9 serves to purge dirt, fluid, and other debris from the above-discussed passages and from between the opposed pairs of sealing faces.

It will be appreciated that the size of the grooves located on the sealing faces and the size of the various passages in the face seal arrangement and shaft members (particularly in FIGS. 6–9) are exaggerated for the purpose of illustration.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A seal assembly in combination with a housing member and a shaft rotatable relative thereto for creating a sealing relationship between areas of high and low pressures, said assembly comprising:
    a face seal structure nonrotatably associated with the housing member and defining thereon a first annular sealing face which surrounds the shaft and extends transversely with respect to a longitudinal axis of the shaft;
    an annular brush surrounding the shaft for rotation therewith and having a plurality of bristles disposed in an annular array about the shaft;
    said brush including an annular holder, said bristles being mounted on said holder such that free ends of said bristles are in sealing contact with the shaft to form a first seal between the areas of high and low pressures;
    said holder defining thereon a second annular sealing face which extends transversely with respect to the shaft axis, said second annular sealing face being disposed in axially adjacent and opposed face-to-face relation with said first annular sealing face; and
    said face seal structure including a passage therein in communication with a gas source for directing a flow of gas between said first and second annular sealing faces to form a non-contacting second seal between the areas of high and low pressures.

2. The seal assembly of claim 1 wherein said annular brush is rotatable along with the shaft solely through engagement of said free ends of said bristles with the shaft.

3. The seal assembly of claim 1 wherein said face seal structure includes a pair of annular plate-like members disposed axially spaced-apart from one another to define a radially extending cavity therebetween, said annular brush being disposed in a free-floating manner within said cavity and said passage communicating with said cavity, said first sealing face being defined on one of said plate-like members.

4. The seal assembly of claim 3 wherein said face seal structure includes a ring disposed between said plate-like members adjacent outer peripheries thereof, said passage extending generally radially through said ring.

5. The seal assembly of claim 3 wherein said holder includes first and second annular plates fixed to one another in axially adjacent relationship, said bristles being stationarily disposed between said first and second plates, said second annular sealing face being disposed on said first plate, the other said plate-like member defining thereon a third annular sealing face which extends transversely with respect to the shaft axis, said second plate defining thereon a fourth annular sealing face which extends transversely with respect to the shaft axis and is disposed in axially adjacent and opposed face-to-face relation with said third annular sealing face, said passage additionally directing a flow of gas between said third and fourth annular sealing faces to form said non-contacting second seal between the areas of high and low pressures.

6. The seal assembly of claim 5 wherein one of said first and second annular sealing faces and one of said third and fourth annular sealing faces includes grooves therein configured to form a gas cushion between said first and second annular sealing faces and between said third and fourth annular sealing faces during relative rotation of said first and second annular sealing faces and said third and fourth annular sealing faces.

7. The seal assembly of claim 1 wherein said face seal structure and said annular brush are disposed and configured to accommodate both radial and axial movements of the shaft.

8. A seal assembly in combination with relatively rotatable inner and outer members for creating a sealing relationship between areas of high and low pressures, said assembly comprising:
   a face seal structure nonrotatably associated with one of the inner and outer members and defining thereon first and second annular sealing faces which extend transversely with respect to a longitudinal axis of the one member;
   an annular brush disposed between the inner and outer members and including an annular array of bristles having free ends in sealing contact with the other member to form a first seal between the areas of high and low pressures and to cause rotation of said brush along with the other member; and
   said brush including thereon third and fourth annular sealing faces which extend transversely with respect to the axis, said third and fourth annular sealing faces being disposed in axially adjacent and opposed face-to-face relation with the respective said first and second annular sealing faces to form a non-contacting second seal between the areas of high and low pressures.

9. The seal assembly of claim 8 wherein said brush is rotatable along with the other member solely through frictional engagement of the free ends of said bristles with the other member.

10. The seal assembly of claim 8 wherein said face seal structure includes a pair of annular plate-like members respectively defining thereon said first and second annular sealing faces, said plate-like members being disposed axially spaced-apart from one another to define a generally radially extending cavity therebetween, said brush being disposed in a free-floating manner within said cavity.

11. The seal assembly of claim 10 wherein said plate-like members each define a network of passages therein, said passages opening at the respective said first and second annular sealing faces for communication with said cavity, said passages additionally communicating with a feed passage disposed within the one member which feed passage communicates with the high pressure area.

12. The seal assembly of claim 11 wherein said passages of said plate-like members discharge high pressure gas from the high pressure area into said cavity and against the respective said third and fourth annular sealing faces to form a gas film between said first and third annular sealing faces and said second and fourth annular sealing faces.

13. The seal assembly of claim 11 wherein said passages of said plate-like members open at the respective said first and second annular sealing faces via pockets defined therewithin, and said passages communicate with the feed passage of the one member via respective feed channels disposed within the one member.

14. The seal assembly of claim 10 wherein one of said first and third annular sealing faces and one of said second and fourth annular sealing faces includes grooves therein configured to form a gas cushion between the opposed pairs of said sealing faces during relative rotation of said first and third annular sealing faces and said second and fourth annular sealing faces.

15. The seal assembly of claim 8 wherein one of said first and third annular sealing faces and one of said second and fourth annular sealing faces includes grooves therein configured to form a gas cushion between the opposed pairs of said sealing faces during relative rotation of said first and third annular sealing faces and said second and fourth annular sealing faces.

16. The seal assembly of claim 15 wherein said grooves are disposed to receive high pressure gas from the high pressure area.

17. A seal assembly for creating a sealing relationship between areas of high and low pressures, said assembly comprising:
   an inner member;
   an outer member disposed in surrounding relation with said inner member;
   a face seal structure nonrotatably associated with one of said inner and outer members and defining thereon first and second annular sealing faces which extend transversely with respect to a longitudinal axis of said one member;
   an annular brush including an annular array of bristles having free ends in sealing contact with the other member to form a first seal between the areas of high and low pressures, said brush being rotatable along with said other member to minimize wear of at least said other member; and
   said brush including thereon third and fourth annular sealing faces which extend transversely with respect to the axis, said third and fourth annular sealing faces being disposed in axially adjacent and opposed face-to-face relation with the respective said first and second annular sealing faces to form a non-contacting second seal between the areas of high and low pressures.

18. The seal assembly of claim 17 wherein said brush is rotatable along with said other member solely through frictional engagement of the free ends of said bristles with said other member.

19. The seal assembly of claim 17 wherein said face seal structure includes a pair of annular plate-like members respectively defining thereon said first and second annular sealing faces, said plate-like members being disposed axially spaced-apart from one another to define a generally radially extending cavity therebetween, said one member includes a feed passage therein in communication with the high pressure area, said feed passage opening into said cavity for directing high pressure gas thereinto such that said brush is disposed in a free-floating manner within said cavity.

20. The seal assembly of claim 19 wherein said feed passage opens into said cavity adjacent an end of said brush opposite said free ends of said bristles to direct high pressure gas against said end of said brush and prevent contact of said brush with said one member.

21. The seal assembly of claim 19 wherein said plate-like members each define a network of passages therein, said passages opening at the respective said first and second annular sealing faces for communication with said cavity and for discharging high pressure gas from the high pressure area into said cavity and against the respective said third and fourth annular sealing faces to form a gas film between said first and third annular sealing faces and said second and fourth annular sealing faces.

22. The seal assembly of claim 19 wherein one of said first and third annular sealing faces and one of said second and fourth annular sealing faces includes grooves therein configured to form a gas cushion therebetween during relative rotation of said first and third annular sealing faces and said second and fourth annular sealing faces, said grooves being disposed to receive high pressure gas from the high pressure area.

23. A seal assembly in combination with first and second relatively rotatable members for creating a sealing relationship between areas of high and low pressures, said assembly comprising:

a face seal structure nonrotatably associated with one of the first and second members and defining thereon a first annular sealing face which extends transversely with respect to a longitudinal axis of the one member;

an annular brush including a plurality of bristles disposed in an annular array, said bristles having free ends in sealing contact with the other member to form a first seal between the areas of high and low pressures and to cause rotation of said brush along with the other member; and said brush including thereon a second annular sealing face which extends transversely with respect to the axis, said first and second annular sealing faces being disposed in axially adjacent and opposed face-to-face relation with one another to form a non-contacting second seal between the areas of high and low pressures.

24. The seal assembly of claim 23, wherein said face seal structure includes a passage therein in communication with a gas source for directing a flow of gas between said first and second annular sealing faces to form the non-contacting second seal between the areas of high and low pressures.

25. The seal assembly of claim 23, wherein said annular brush is rotatable along with the other member solely through frictional engagement of said free ends of said bristles with the other member.

26. The seal assembly of claim 23, wherein said face seal structure includes a pair of annular plate-like members disposed axially spaced-apart from one another to define a radially extending cavity therebetween, said annular brush being disposed in a free-floating manner within said cavity and a passage communicating with said cavity, said first sealing face being defined on one of said plate-like members.

27. The seal assembly of claim 26, wherein said face seal structure includes a ring disposed between said plate-like members adjacent outer peripheries thereof, said passage extending generally radially through said ring.

28. The seal assembly of claim 23, wherein said face seal structure and said annular brush are disposed and configured to accommodate both radial and axial movements of the other member.

29. The seal assembly of claim 23, wherein said face seal structure includes a pair of annular plate-like members disposed axially spaced-apart from one another to define a radially extending cavity therebetween, said annular brush being disposed in a free-floating manner within said cavity.

30. The seal assembly according to claim 23, wherein said brush includes an annular holder, said holder defining said second annular sealing face.

* * * * *